United States Patent
Loewke et al.

(10) Patent No.: US 6,264,223 B1
(45) Date of Patent: Jul. 24, 2001

(54) PASSENGER CARRIER FOR BICYCLE

(76) Inventors: Eunice R. Loewke, 2320 Moonlight Way, Santa Rosa, CA (US) 95403; Daniel David Loewke, P.O. Box 213, Orcas, WA (US) 98280

(*) Notice: Subject to any disclaimer, the term of this patent is extended or adjusted under 35 U.S.C. 154(b) by 0 days.

(21) Appl. No.: 09/507,906

(22) Filed: Feb. 22, 2000

(51) Int. Cl.[7] .................................................. B62J 1/16
(52) U.S. Cl. .................. 280/202; 224/426; 297/215.11; 297/195.13
(58) Field of Search .......................... 297/195.1, 195.11, 297/195.13, 196, 215.11, 215.1; 280/304.5, 291, 202, 288.4; 224/415, 419, 426, 427

(56) References Cited

U.S. PATENT DOCUMENTS

| | | | |
|---|---|---|---|
| 2,234,299 | * | 3/1941 | Christy . |
| 3,544,158 | * | 12/1970 | Timms . |
| 3,743,321 | * | 7/1973 | Luschen et al. ............... 280/202 |
| 4,305,532 | * | 12/1981 | Reminger ........................ 224/31 |
| 4,919,479 | * | 4/1990 | Loewke et al. ................. 297/195 |
| 5,190,306 | * | 3/1993 | Nauman et al. ............... 280/202 |
| 5,330,215 | * | 7/1994 | Bishaf et al. .................. 280/202 |
| 5,467,906 | * | 11/1995 | Forman ........................... 224/39 |
| 5,800,014 | * | 9/1998 | Musso, Jr. ...................... 297/243 |
| 5,927,801 | * | 7/1999 | Miree ........................... 297/195.1 |

* cited by examiner

*Primary Examiner*—Brian L. Johnson
*Assistant Examiner*—Avraham H. Lerner
(74) *Attorney, Agent, or Firm*—Howard Cohen

(57) ABSTRACT

A bicycle passenger carrier for a child includes a longitudinally extending body having a front end and a rear end, with a passenger seat disposed medially between the two ends. The rear end of the body includes a rear clevis to engage the seat post of a bicycle frame in close fit. The passenger seat includes a curved seat back extending upwardly from the body. At the front end of the body, a forward portion extends downwardly and includes a front clevis adapted to engage either the oblique down tube of a woman's bike or the horizontal tube of a man's bike. A pair of bolt holes extend through the forward portion to receive a bolt that retains the front end on the bicycle. Extending upwardly at the front end of the body is a pommel that provides a hand rest for the passenger, and also serves as a support for a foot rest assembly. The foot rest assembly includes a platform suspended by a strap assembly from the pommel.

11 Claims, 5 Drawing Sheets

PASSENGER CARRIER FOR BICYCLE

BACKGROUND OF THE INVENTION

The present invention relates to an apparatus for carrying a passenger on a bicycle, and in particular a carrier for a passenger wherein the passenger is seated forward of the seat of the rider of the bicycle.

With the exception of a few bicycle-built-for-two designs, all bicycles are designed to support only one individual: a seated rider. However, it is often necessary or desirable to carry a passenger on a bicycle. For example, many adults carry small children on bicycles, using bicycle passenger seats that are designed especially for children.

Typically, bicycle passenger seats for children are designed to be secured to the bicycle frame rearwardly of the seat of the rider and above the rear wheel. This arrangement emulates the placement of a typical luggage rack for bicycles. This arrangement is unsatisfactory in at least two aspects: the weight of the child above the rear axle renders the bicycle potentially unstable when the rider dismounts, and the child's view from the passenger seat is obstructed by the legs and torso of the rider perched on the rider's seat.

One bicycle seat design that overcomes these deficiencies in the prior art is described in U.S. Pat. No. 4,919,479, issued to the present inventors in 1990. In this apparatus, the child passenger seat is disposed to extend between the seat post and the steering tube, and to be supported by either the horizontal tube of the frame (in a typical bicycle style for men), or suspended between the seat post and the oblique down tube of the frame (in a typical bicycle style for women). This arrangement places the passenger medially between the front and rear wheels, resulting in a far more stable distribution of the passenger's weight on the frame. Moreover, the child passenger is afforded an excellent view, unobstructed by the body of the bicycle rider. The present invention is an improvement over this prior art apparatus, and is significantly different structurally, especially in the front attachment arrangement and the child footrest.

SUMMARY OF THE INVENTION

The present invention generally comprises a bicycle passenger carrier for a child. The carrier is comprised of a longitudinally extending body having a front end and a rear end, with a passenger seat disposed medially between the two ends. The rear end of the body includes a rear clevis defined by a longitudinally extending slot that is dimensioned to engage the seat post of a bicycle frame in close fit. The clevis engagement of the seat post prevents rotation of the body about the longitudinal axis thereof, while permitting the carrier to be mounted on bicycles of different sizes and configurations. At least one bolt hole extends laterally through the clevis tines to receive a bolt that secures the rear of the body to the seat post.

The passenger seat includes a back support comprised of a curved seat back extending upwardly from the body. At the front end of the body, a forward portion extends downwardly and is provided with a front clevis adapted to engage either the oblique down tube of a woman's bike or to receive the horizontal tube of a man's bike. The front clevis is defined by a front slot opening forwardly and downwardly. A pair of bolt holes extend laterally through the forward portion, and are positioned to receive a bolt that retains the front end on either the horizontal tube of a man's bicycle or the down tube of a woman's bicycle.

Extending upwardly at the front end of the body is a pommel or saddle horn. The pommel provides a hand rest for the passenger, and also serves as a support for a foot rest assembly. The foot rest assembly includes a platform having the configuration of a shallow tray with an open forward side. A strap assembly includes a closed loop strap extending through slots in opposed sides of the platform, with a strap portion extending laterally between the opposed sides and across the platform. A medial portion of the strap assembly includes a medial opening for receiving and securing the pommel. The platform is suspended on the strap assembly for supporting the feet of a passenger riding in the passenger seat.

The passenger carrier is secured to a bicycle by first placing the carrier so that the seat post extends through the rear clevis, and the front clevis engages either the oblique down tube of a woman's bike or the horizontal tube of a man's bike. A pair of bolts or similar fasteners is secured through the rear clevis and the front clevis, and the foot rest assembly is secured to the pommel, and the installation is complete. To remove the passenger carrier, the process is reversed. No modification of the bicycle is required, nor is there any permanent hardware required to install or remove the carrier.

DESCRIPTION OF THE PREFERRED EMBODIMENT

Figure 1:
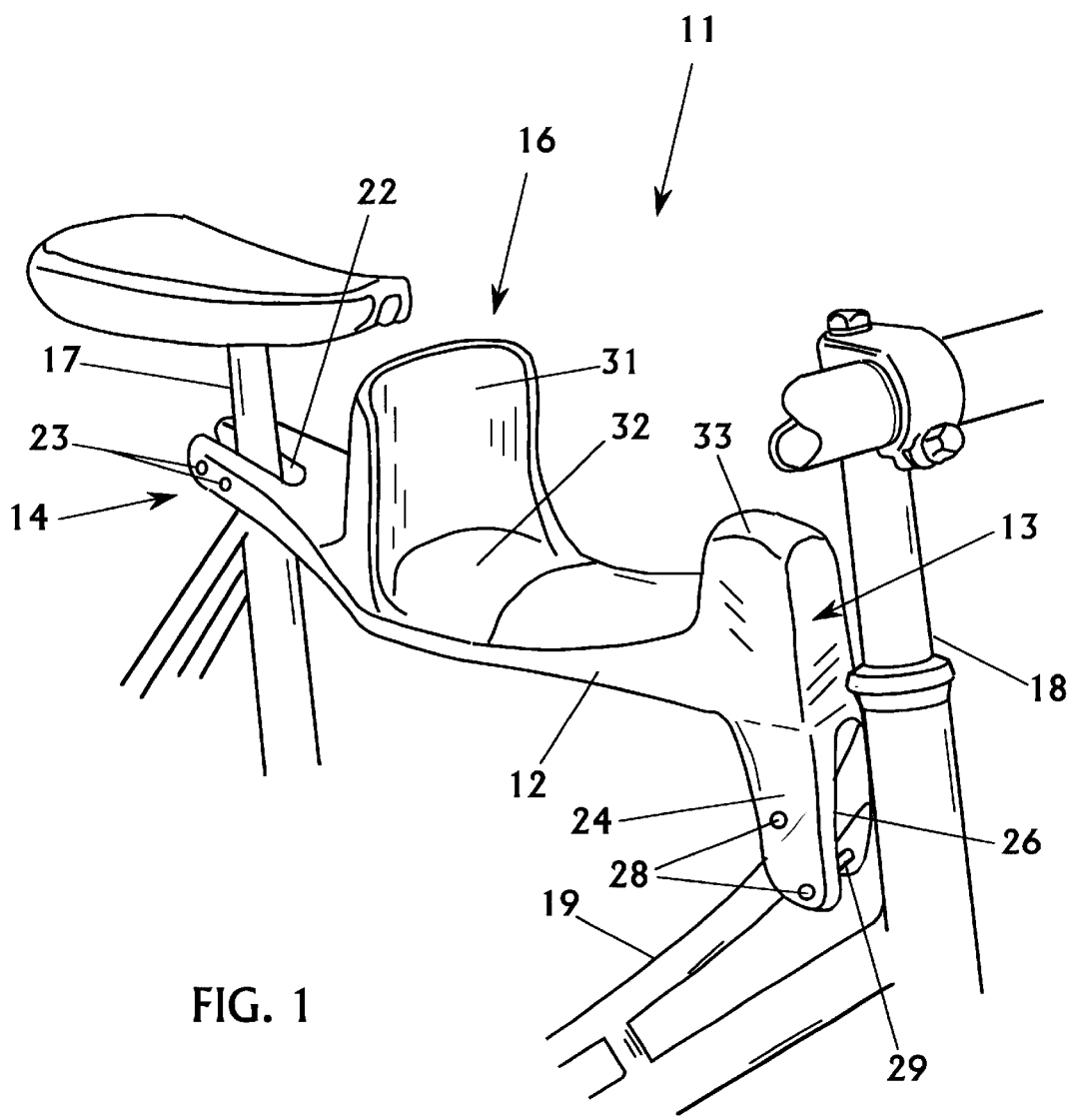
FIG. 1 is a perspective view of the passenger carrier of the present invention, shown mounted on a typical bicycle.

The present invention generally comprises a bicycle passenger carrier for a child. With reference to the accompanying Figures, the carrier 11 is comprised of a longitudinally extending body 12 having a front end 13 and a rear end 14, and a passenger seat 16 located medially between the ends 13 and 14. The carrier is adapted for use with a wide range of bicycle sizes and types, all of which are typically provided with a seat post 17 and a front steering assembly 18, and either at least one oblique down tube 19 for a woman's bicycle or a horizontal tube 21 (FIG. 5) for a man's bicycle.

Figure 2:
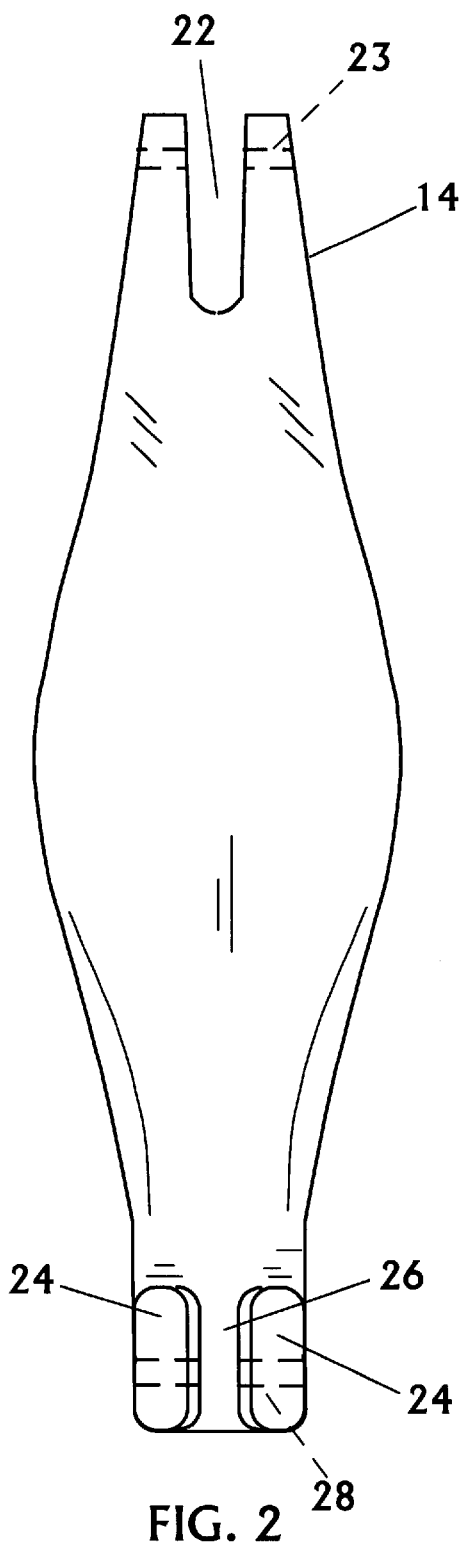
FIG. 2 is a bottom plan view of the bicycle passenger carrier shown in FIG. 1.
Figure 3:
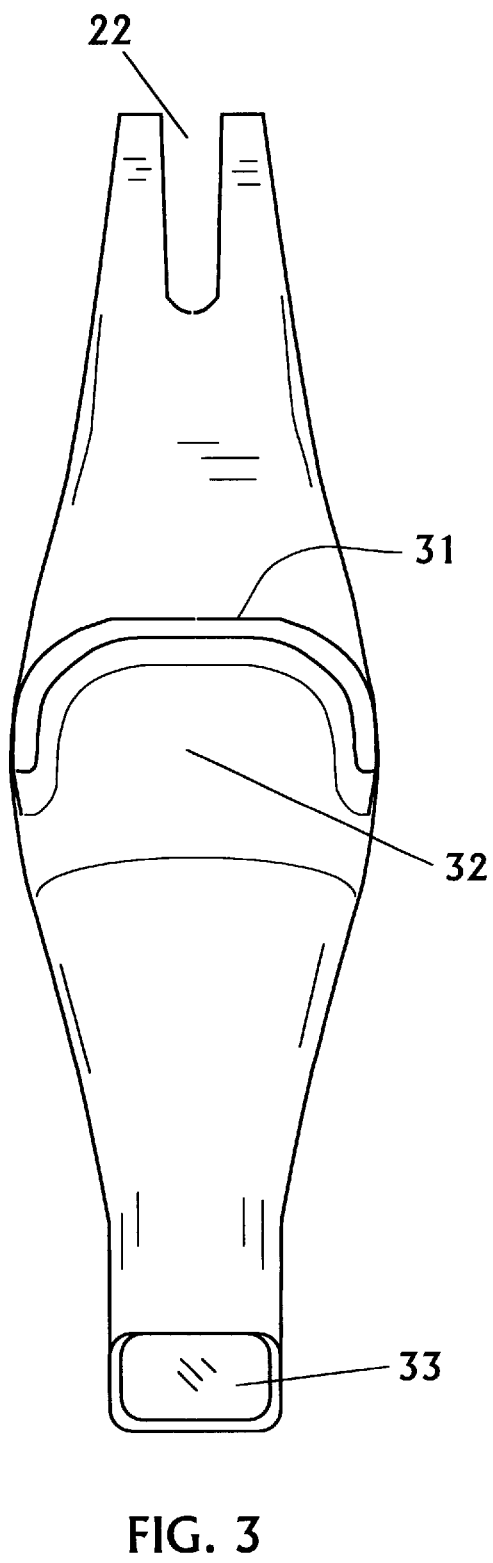
FIG. 3 is a top plan view of the bicycle passenger carrier shown in FIGS. 1 and 2.
Figure 4:
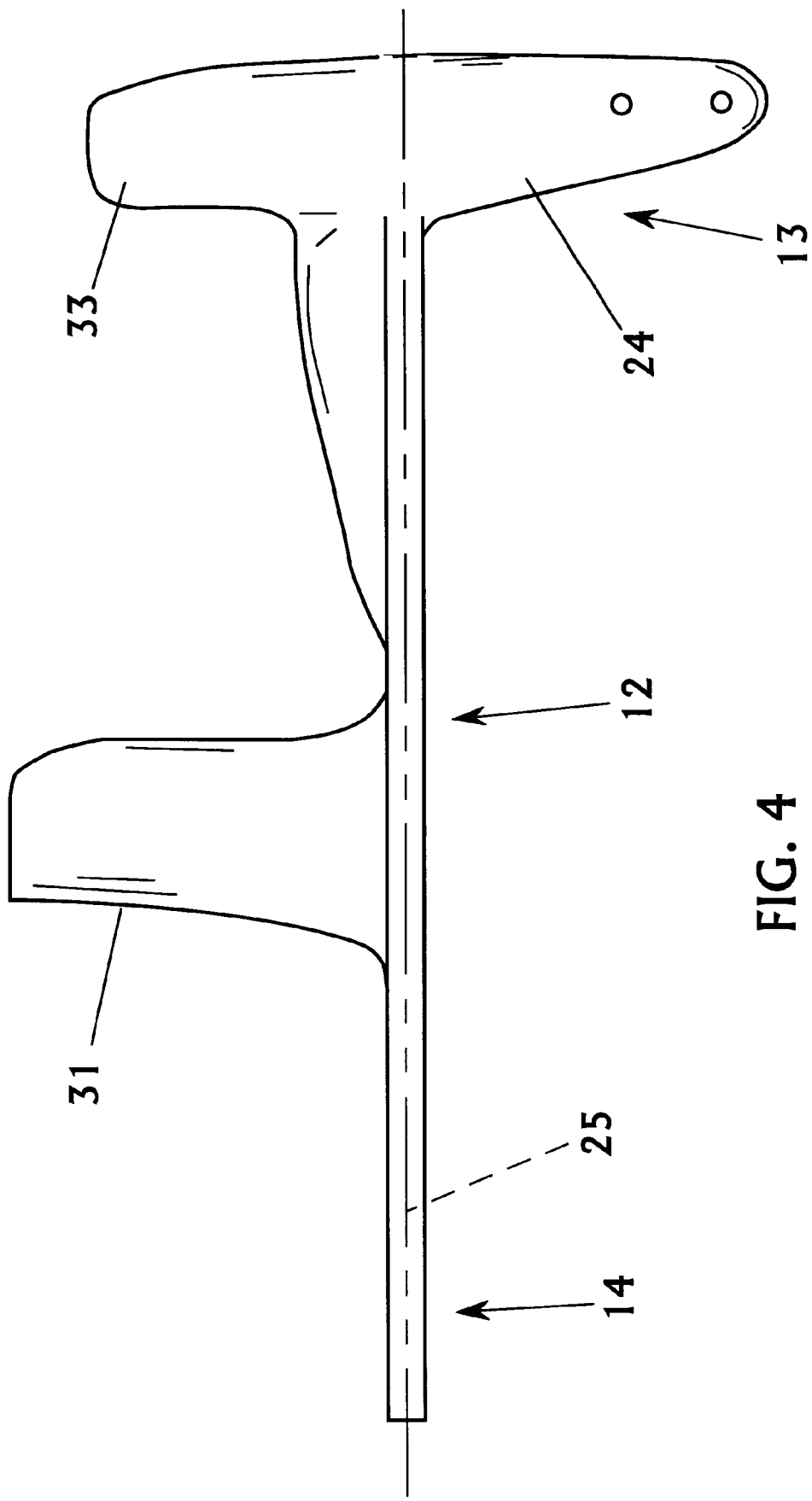
FIG. 4 is a side elevation of the bicycle passenger carrier shown in FIGS. 1–3.

The rear end 14 of the body 12 includes a rear clevis 22 that opens rearwardly and is dimensioned to receive therein the seat post 17 of a bicycle. The clevis 22 extends longitudinally and flares slightly toward the outer opening thereof, as shown in FIGS. 2 and 3, to accept seat posts of various diameters. A pair of bolt holes 23 extend laterally through the ends of the clevis to secure a seat post 17 within the clevis, thereby securing the rear end 14 to the bicycle. The spacing of the pair of holes 23 enables the accommodation of bicycles of different size and length configurations.

At the front end 13 of the carrier body 12, a forward portion 24 extends downwardly from the nominal plane 25 of the body, as shown in FIGS. 1 and 4–6. The forward portion 24 is defined by smoothly contoured side walls that extend integrally with the body 12. A front clevis 26 extends through the forward portion 24, opening forwardly and downwardly from the plane 25. The clevis 26 is aligned with the rear clevis 22, and is dimensioned to receive therein either the oblique tube 19 or the horizontal tube 21 of a bicycle. The clevis is defined by a longitudinally extending slot that is flared outwardly and downwardly, so that it will receive and come to rest on bicycle tubes of varying diameters. A pair of holes 28 for a bolt 29 or similar fastener extend laterally through the forward portion and through the clevis 26 to receive a bolt 29 that extends beneath the tube 19 or tube 21 and secure the front end 13 to the bicycle frame. The spacing of the holes 28 enables the accommodation of men's and women's bicycles and most size variations thereof.

The passenger seat 16 includes a back rest defined by an upwardly extending panel 31 that is curved about a vertical axis to form a concave recess that is dimensioned generally to support the back of a child passenger. The lateral surface adjacent to and forward of the panel 31 is provided with a recess 32 contoured to engage and comfortably support the child passenger. A seat belt (not shown) extends about the seat post 17 and is used to secure the child passenger in the seat 16.

Figure 5:
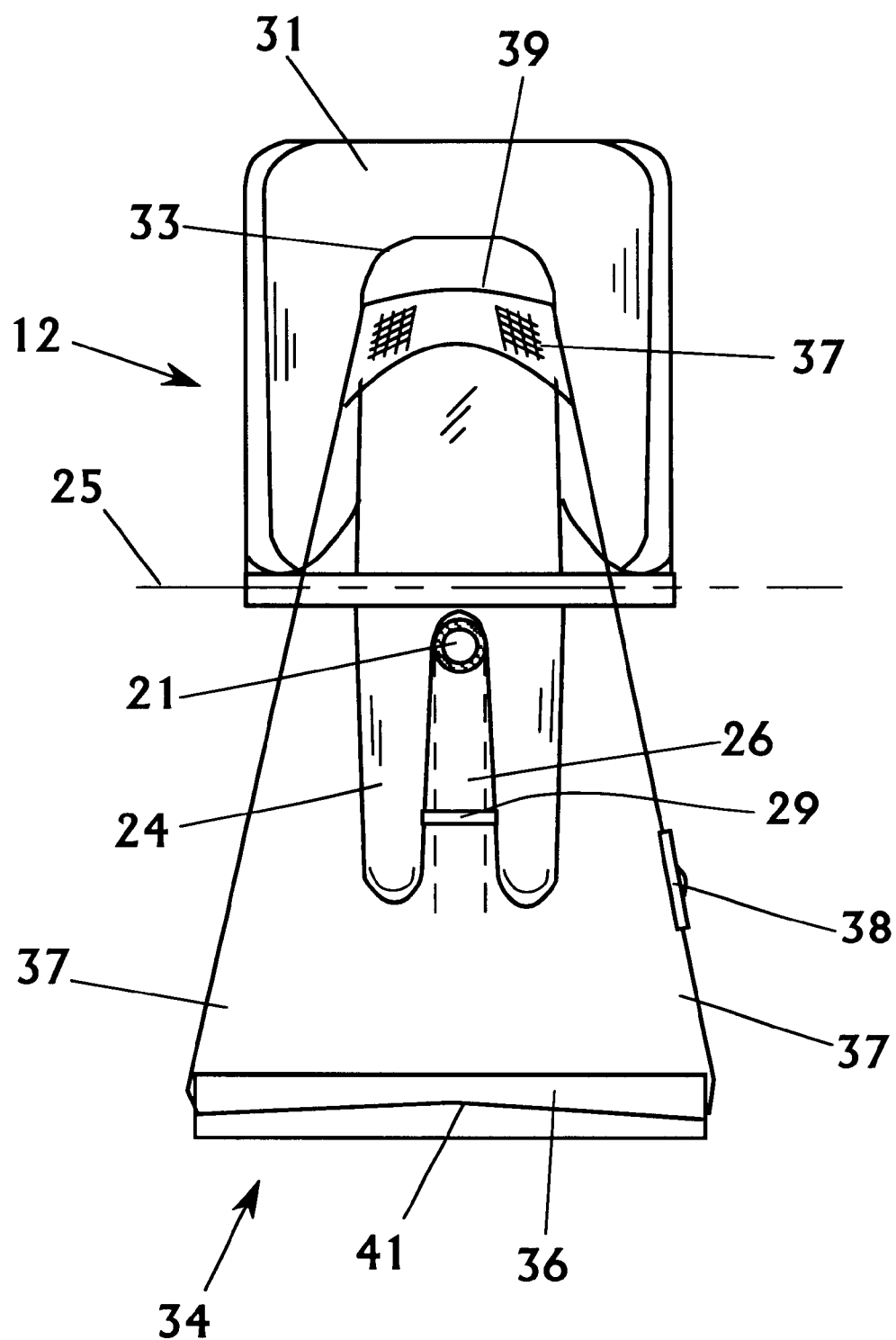
FIG. 5 is a front elevation of the bicycle passenger carrier shown in FIG. 1–4.
Figure 6:
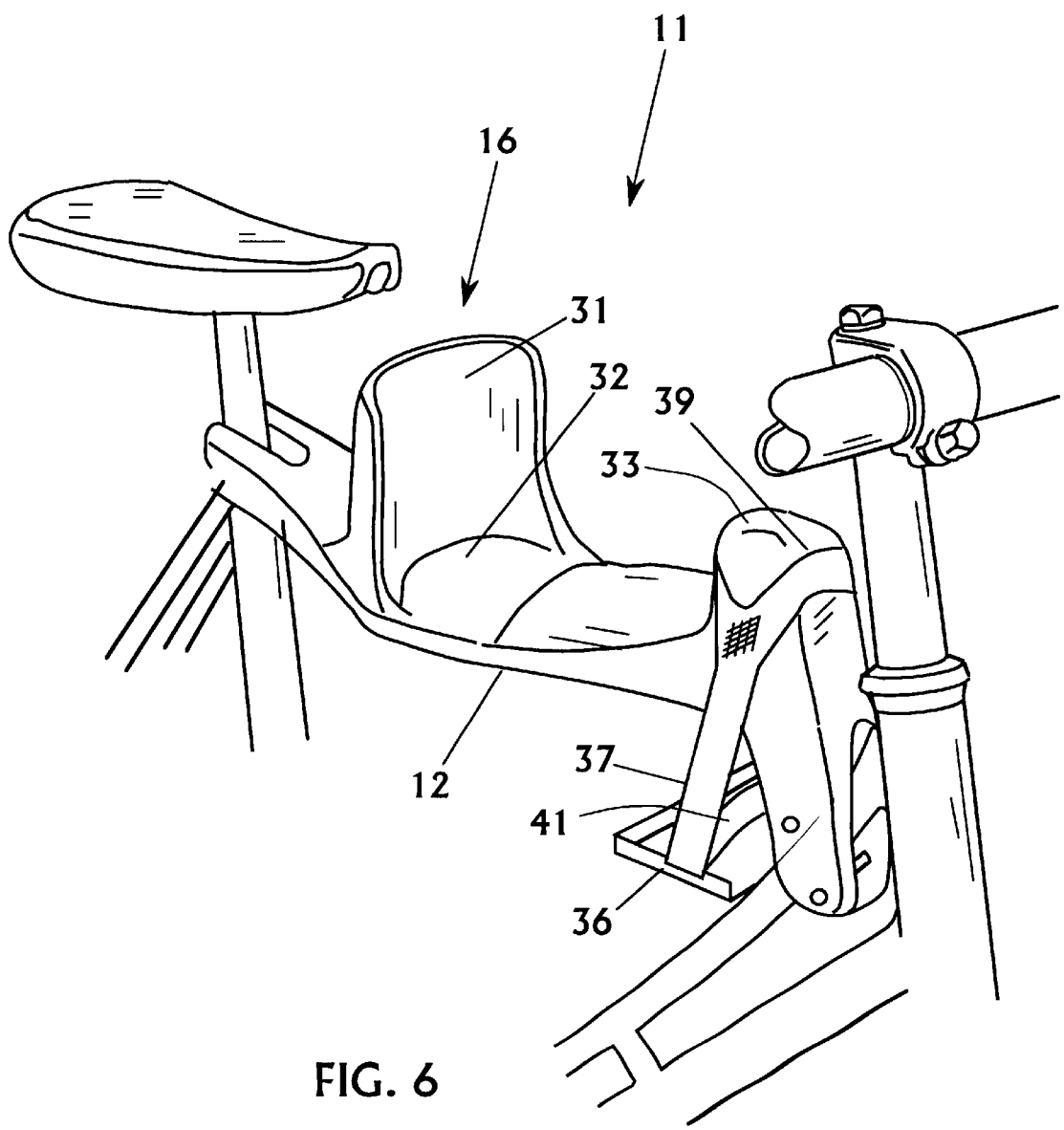
FIG. 6 is a perspective view of the passenger carrier and foot rest assembly of the invention, shown mounted on a typical bicycle.

The front end 13 further includes a pommel or saddle horn 33 extending upward from the nominal plane 25, the pommel being defined by smoothly contoured side walls that extend integrally with the body 12. The pommel 33 provides a convenient hand rest for the child passenger. Moreover, the pommel 33 acts as a support for a foot rest assembly 34, as shown in FIGS. 5 and 6. The foot rest assembly 34 includes a platform 36 having the configuration of a shallow tray with an open forward side. A strap assembly 37 includes a closed loop strap slidably extending through slots in opposed sides of the platform, with a portion 41 extending laterally between the opposed sides and across the platform 36. At the upper end of the loop, a medial portion of the strap assembly 37 is provided with a medial opening 39 that is dimensioned to engaging and retaining the pommel 33, so that the strap assembly suspends the platform 36 from the pommel 33. A fastener 38 permits the closed loop to be opened and adjusted in length so that the height of the platform may be adjusted to suit the child passenger.

The entire passenger carrier, excluding the foot rest assembly, may be formed in one step by plastic molding; for example, rotational molding, so that the carrier is one integral unit. This manufacturing technique creates a lightweight body 12 that is sufficiently strong to be self-supporting when used to span the distance between the seat post and steering post of a woman's bicycle. Moreover, there are no seams or junctions to separate and fail.

To secure the passenger carrier 11 to a bicycle, the carrier 11 is held above a bicycle between the seat and the handlebars. The rear end of the carrier is lowered to slide the rear clevis 22 onto the seat post of the bicycle. Next, the front clevis 26 is lowered so that it sits astride the horizontal tube 21 or oblique down tube 19 of a women's bicycle. Then, the two bolts 23 and 29 are inserted and secured, thus locking the carrier behind the seat post and under the forward frame tube. This process requires only a few seconds to complete. To attach the foot rest assembly, the opening 39 of the strap assembly is placed over the pommel 33, and the fastener 38 is adjusted and closed to secure the platform 36 above the bar 19 or beneath the bar 21. Removal of the passenger carrier involves reversing these steps, which is also easily done in a few seconds. No modification of the bicycle is required, nor is there any permanent hardware required to install or remove the carrier.

To seat a child passenger on the carrier, the child is seated on the portion 32, leaning back against the back rest 31 with the legs astride the carrier. The child's feet are placed in side-by-side fashion on the platform 36, with the toes extending under the portion 41 of the strap assembly 37 (FIG. 6) that spans the upper surface of the platform. The seat belt is then placed around the waist of the child and behind the seat post 17, and may be secured to the seat post 17 of the bicycle.

The child passenger carrier of the invention offers the following advantages over commercially available bicycle passenger seats:

1) The front clevis and forward portion enable the carrier to be installed on a wide range of men's and women's bicycles with a minimum of effort and time;
2) The child passenger can see where the bicycle is heading, and the passenger and rider can talk to one another;
3) By gripping the handlebars, the rider's arms encircle the child passenger in protective and comforting fashion;
4) The placement of the child passenger intermediate of the seat post and steering post does not significantly alter the center of gravity of the bicycle, so that riding with a passenger is not much different from riding solo;
5) Placement of the child passenger carrier at the front of the bicycle enables the use of a typical prior art bicycle luggage carrier adjacent to the rear wheel, so that carrying a child does not diminish the ability to transport other goods and items.
6) With the child "up front," the rider may immediately recognize any problem that may arise with the child. Also, the rider can prevent the child from extending arms or legs in a dangerous manner.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

What is claimed is:

1. A bicycle carrier for a child passenger, including:
 a longitudinally extending body having a front end and a rear end,
 said rear end including a rear clevis defined by a longitudinally extending slot opening rearwardly to receive the seat post assembly of a bicycle;
 said front end including a forward portion extending downwardly;
 a front clevis defined by a longitudinally extending slot opening downwardly and forwardly to engage the oblique down tube of a woman's bicycle or the horizontal tube of a man's bicycle;
 a passenger seat disposed medially of said front and rear ends;
 a pommel portion extending upwardly from said front end;
 a foot rest assembly secured to said body, said foot rest assembly including a strap assembly, and means for suspending said strap assembly from said pommel.

2. The bicycle carrier for a child passenger of claim 1, wherein said passenger seat includes back support means for the child passenger comprised of a seat back portion extending upwardly from said body.

3. The bicycle carrier for a child passenger of claim 2, wherein said seat back portion includes a curved conformation about a generally vertical axis, said curved conformation defining a concave shape opening toward said front end.

4. The bicycle carrier for a child passenger of claim 3, further including a recessed portion disposed forwardly of and adjacent to said seat back portion and contoured to support the bottom of a child passenger.

5. The bicycle carrier for a child passenger of claim 1, wherein said means for suspending includes a medial opening in said strap assembly for releasably engaging a portion of said pommel.

6. The bicycle carrier for a child passenger of claim 1, wherein said foot rest assembly includes a foot support platform depending from said strap assembly.

7. The bicycle carrier for a child passenger of claim 1, further including a buckle assembly secured to said strap assembly for opening and selectively altering the size of said strap assembly in length-adjusting fashion.

8. A bicycle carrier for a child passenger, including:

a longitudinally extending body having a front end and a rear end, said rear end including a rear clevis defined by a longitudinally extending slot opening rearwardly to receive the seat post assembly of a bicycle;

said front end including a forward portion extending downwardly;

a front clevis defined by a longitudinally extending slot opening downwardly and forwardly to engage the oblique down tube of a woman's bicycle or the horizontal tube of a man's bicycle;

a passenger seat disposed medially of said front and rear ends, said front clevis defined by a longitudinally extending slot that is flared outwardly and downwardly to receive and come to rest on bicycle tubes of varying diameters;

a front fastener removably extending across said front clevis for securing said front end to the oblique down tube of a woman's bicycle or the horizontal tube of a man's bicycle; and, a plurality of holes extending across said front clevis in spaced apart disposition to receive said front fastener and accommodate bicycles of various sizes and configurations.

9. A bicycle carrier for a child passenger, including:

a longitudinally extending body having a front end and a rear end, said rear end including a rear clevis defined by a longitudinally extending slot opening rearwardly to receive the seat post assembly of a bicycle;

said front end including a forward portion extending downwardly;

a front clevis defined by a longitudinally extending slot opening downwardly and forwardly to engage the oblique down tube of a woman's bicycle or the horizontal tube of a man's bicycle;

a passenger seat disposed medially of said front and rear ends;

said rear clevis flared outwardly and rearwardly to accept seat posts of varying diameter;

a rear fastener removably extending across said rear clevis for securing said rear end to the seat post of a bicycle; and, a plurality of holes extending across said rear clevis in spaced apart disposition to receive said rear fastener and accommodate bicycles of various sizes and configurations.

10. The bicycle carrier for a child passenger of claim 9, further including a pommel portion extending upwardly from said front end.

11. The bicycle carrier for a child passenger of claim 10, wherein said carrier is formed in integral fashion without seams or junctions.

* * * * *